April 17, 1928.  H. H. HACKSTEDDE  1,666,285
MIXING MACHINE
Filed June 21, 1924   3 Sheets-Sheet 1

INVENTOR
H. H. Hackstedde,
By Hubbard & Hubbard
His Attorneys

WITNESS:—
Chas. L. Griesbauer

April 17, 1928.　　　　　　　　　　　　　　　　　　1,666,285
H. H. HACKSTEDDE
MIXING MACHINE
Filed June 21, 1924　　　　3 Sheets-Sheet 2
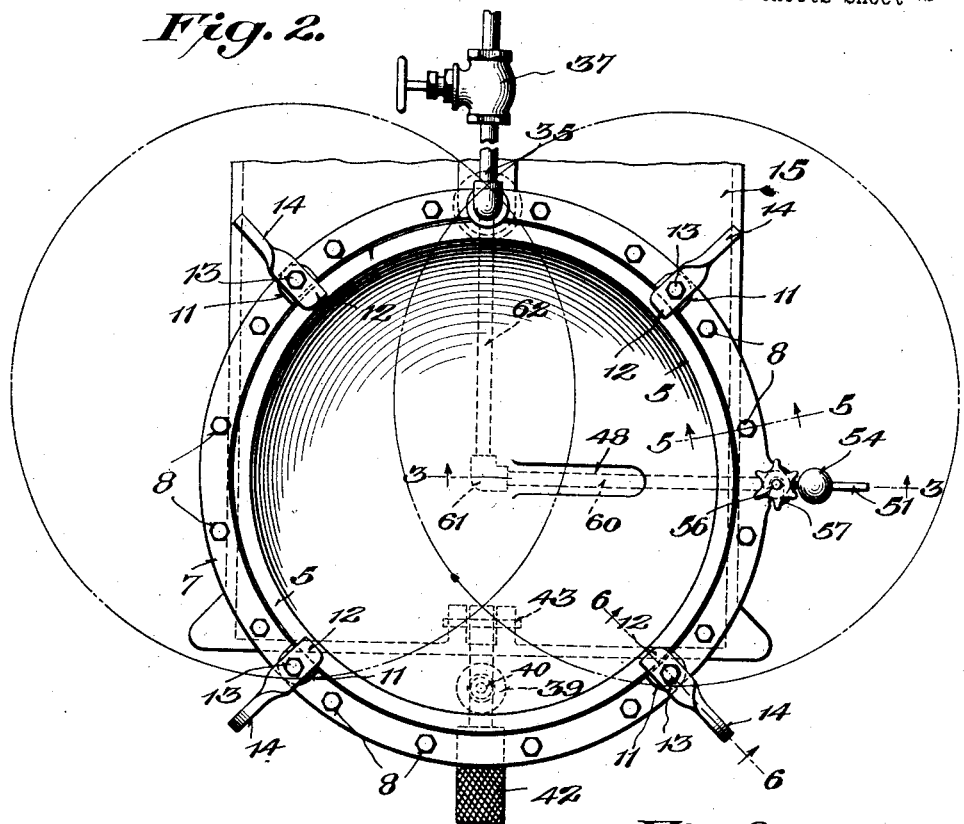
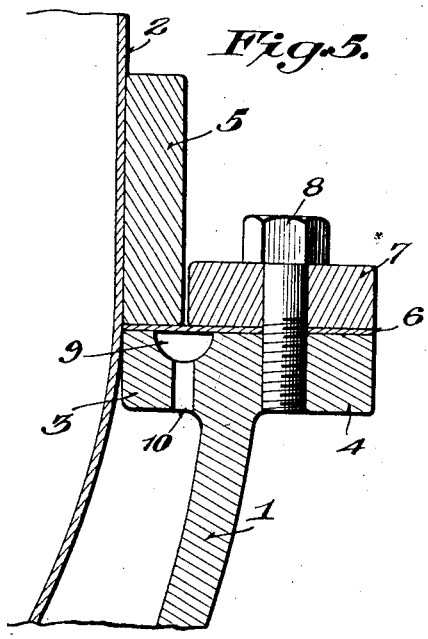
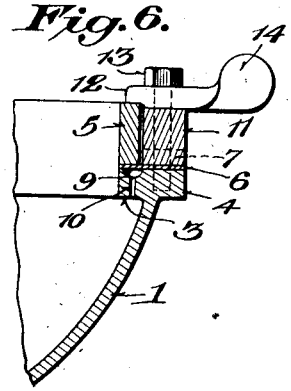
Inventor
H. H. Hackstedde,
By Hubard & Hubard
his Attorneys April 17, 1928.  1,666,285

H. H. HACKSTEDDE

MIXING MACHINE

Filed June 21, 1924    3 Sheets-Sheet 3

Inventor
H. H. Hackstedde,

WITNESS:—

Patented Apr. 17, 1928.

1,666,285

UNITED STATES PATENT OFFICE.

HERBERT H. HACKSTEDDE, OF CINCINNATI, OHIO.

MIXING MACHINE.

Application filed June 21, 1924. Serial No. 721,452.

This invention relates to mixing machines for mixing dough, confections and the like, and the prime object of the invention is to provide for tempering the contents of the mixing bowl in a simple and efficient manner without interfering with the usual functions of the mixing machine.

In carrying out the invention I employ a bowl-holder which, in addition to its function of supporting the bowl, also co-operates therewith in a manner to form a jacket enclosing the bottom portion of the bowl and designed to receive a tempering fluid whereby the contents of the bowl may be either tempered or cooked as desired.

A further object of the invention is to enable the usual lateral swinging of the bowl-holder into its operative and inoperative positions while at the same time maintaining the bowl-holder in communication with the supply of tempering fluid.

A still further object of the invention is to provide for conveniently and efficiently draining the bowl-holder to a predetermined tank or the like regardless of the position of the bowl-holder.

Another object of the invention is to effect a fluid-tight joint between the bowl and the bowl-holder in a very simple and efficient manner and at the same time to permit of the convenient introduction of a mixing bowl into and removing the same out of the bowl-holder without requiring any removal of the essential parts of the fluid-tight joint.

In the drawings:

Figure 2 is a plan view of the present invention.

Figure 5 is an enlarged detail sectional view on the line 5—5 of Figure 2.

Figure 6 is an enlarged detail sectional view on the line 6—6 of Figure 2.

Figure 1:
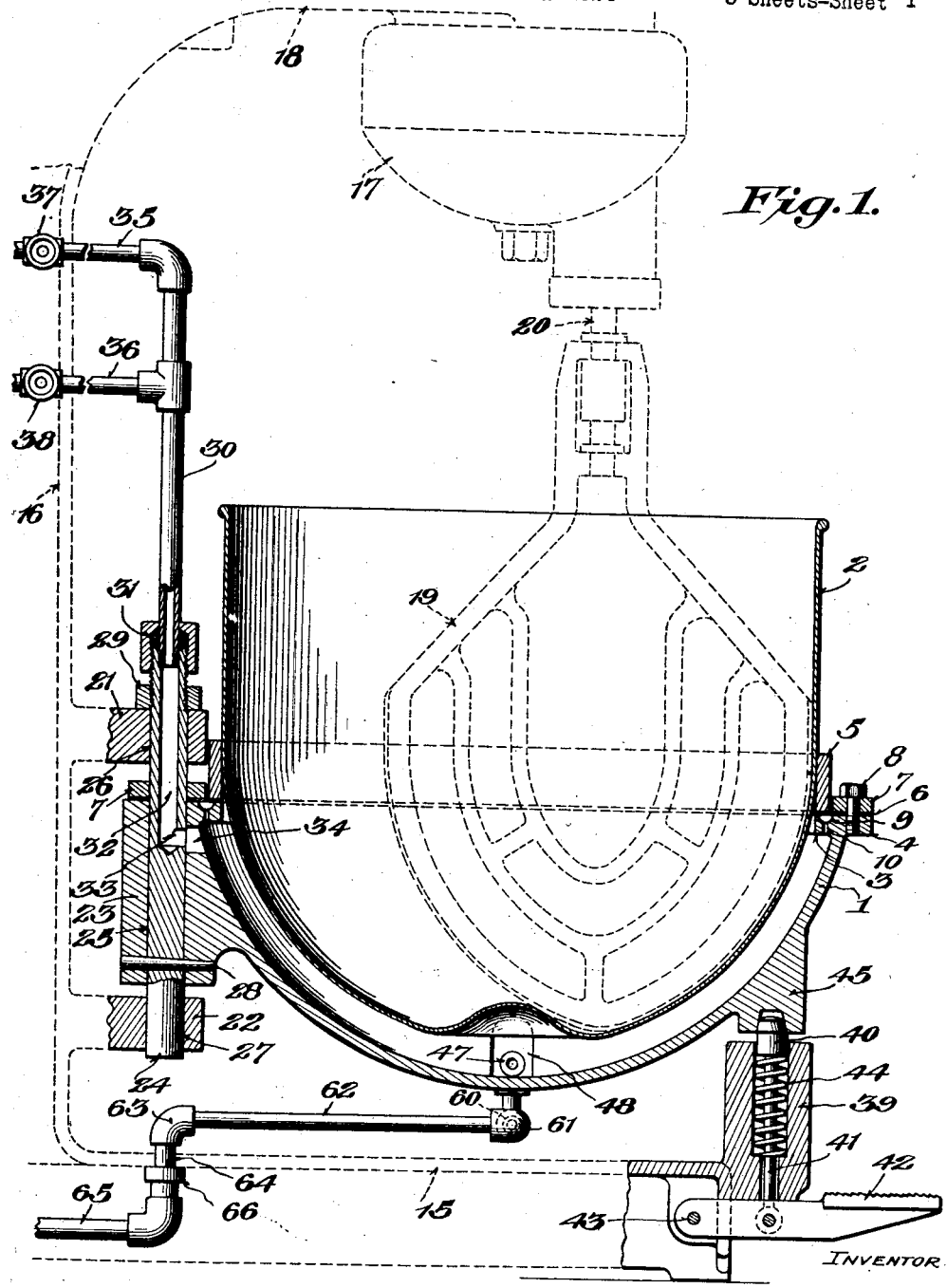
Figure 1 is a vertical central sectional view of a mixing bowl-holder embodying features of the present invention, portions of a mixing machine being shown in dotted lines.
Figure 3:
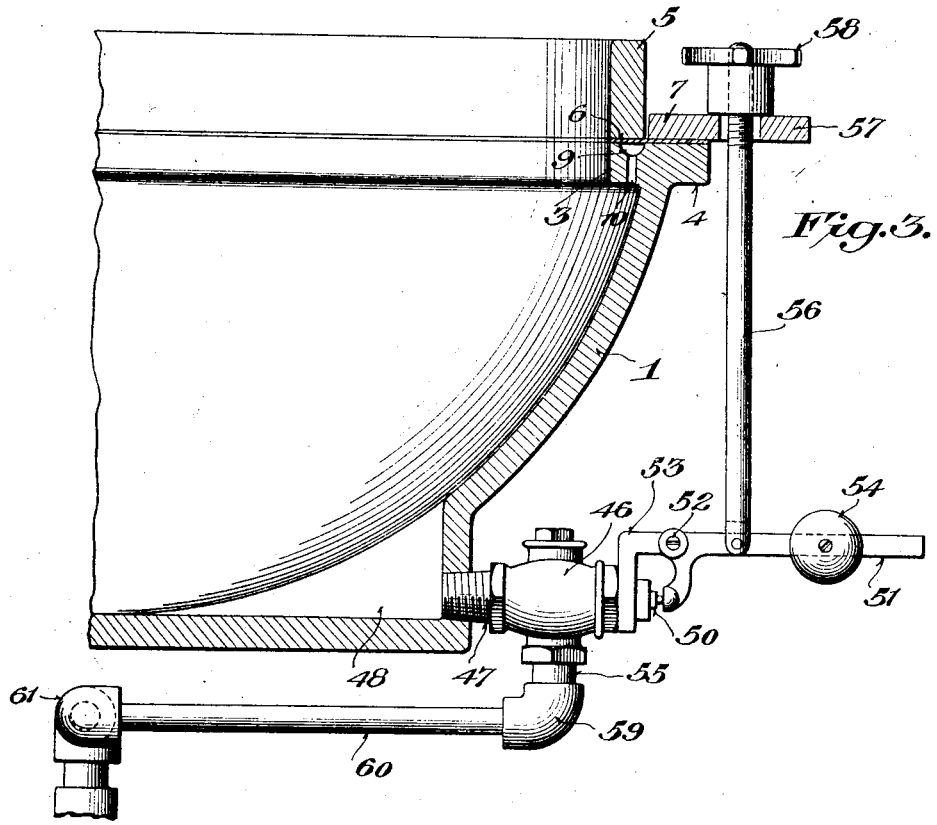
Figure 3 is an enlarged sectional elevation on the line 3—3 of Figure 2.
Figure 4:
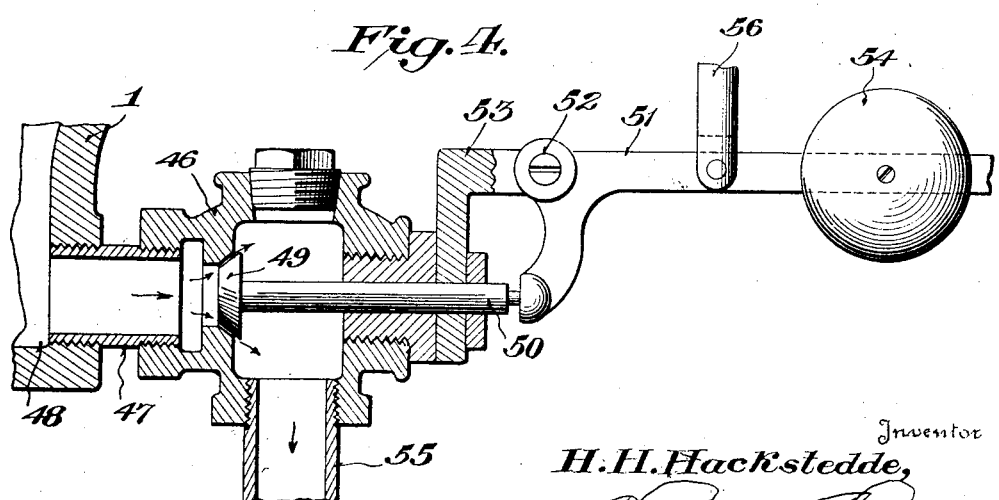
Figure 4 is an enlarged detail sectional view of the drain and blow-off valve.

The holder of the present invention includes an open topped hollow substantially semi-spherical body 1 which constitutes a seat for the usual mixing bowl 2. Extending around the top of the seat body 1 there is an internal annular horizontal flange 3 and a similar external flange 4, the top faces of the two flanges being in the same plane. The mixing bowl 2 is equipped with an external band 5 embracing the mixing bowl at about where the side walls thereof start to curve inwardly and downwardly, and this band is rigidly secured to the bowl in any suitable manner. The internal diameter of the bowl supporting seat 1 is just sufficient to conveniently receive the bowl 2 whereby the band 5 may rest upon the top of the flange 3 and thereby support the bowl 2 within the seat 1 and spaced therefrom as well shown in Figures 1 and 5 of the drawings. The space between the lower portion of the bowl 2 and the bowl supporting seat 1 is designed to receive a tempering fluid, such for instance as steam for heating purposes or water, hot or cold, for tempering purposes as will hereinafter be explained. A packing ring or gasket 6 covers the flange at the top of the bowl support 1, and the band 5 rests upon this gasket. Outside of the band 5 is a ring 7 which rests upon the gasket 6 and is secured to the flange 4 by suitable screw threaded fastenings 8 whereby the gasket 6 is conveniently held in place. A groove or channel 9 is provided in the top of the flange 3 and extends entirely around the latter. Communication between the bottom of the groove 9 and the space between the bowl support 1 and the bowl 2 is afforded by passages 10, whereby steam pressure within said space is conducted into the channel 9 so as to force the gasket 6 snugly against the under sides of the band 5 and ring 7 and thereby form a steam-tight joint. The same result is accomplished by water pressure when water is employed as a tempering medium. At intervals around the ring 7 there are upstanding bosses 11, and on the top of each boss there is a latch member 12 pivoted intermediate of its ends by means of a suitable fastening 13 extending through the latch and into the boss 11. The outer end of the latch is provided with a handle or finger piece 14, while its inner end portion is shaped and designed to overhang the band 5 and thereby prevent upward displacement of the bowl 2, particularly when the latter is under the influence of steam pressure.

The manner of mounting the present bowl-holder upon a conventional form of mixing machine is best shown in Figure 1 of the drawings, wherein 15 designates the base of some conventional mixing machine from which rises the usual standard 16, carrying at its top, or otherwise suitably located thereon, an electric motor, not shown on the drawings, which motor, as usual, drives gearing contained in a housing designated 17 depending from the usual arm 18 extending laterally from the standard 16 and overhanging the top of the bowl. A conventional form of beater 19 has been shown in dotted lines within the bowl 2 and depending from a beater shaft 20 extending downwardly from the gear casing 17. Extending laterally from the standard 16 are upper and lower lugs 21 and 22 as are commonly found in the Hackstedde type and other types of mixing machines, and between these lugs there is received a lug or ear 23 extending laterally from the back of the bowl support 1 and having its top flush with and constituting a continuation of the combined flanges 3 and 4 at the top of the bowl support. An upright pintle member 24 extends through a vertical opening 25 in the ear 23 and projects upwardly and through an eye 26 in the lug 21 and downwardly through an eye 27 in the lug 22. The pintle is fixed to the ear 23 in any suitable manner, as for instance by means of a pin or key 28. It will of course be understood that the ring 7, which rests upon the top of the lug 23, is provided with an opening to accommodate the pintle 24. The pintle portion above the lug 21 is screw threaded and carries a nut 29 which rests upon the top of the lug 21 and constitutes, with the pintle 24, a hanger on which the bowl support 1 is supported upon the standard 16 of the mixing machine. The pintle 24 is capable of rotating in the eyes 26 and 27, and as the pintle and the bowl support 1 are rigidly connected, it will be understood that the bowl member may swing horizontally upon the pintle 24 as a vertical axis in order to provide for inserting and removing the bowl through the open top of the bowl support 1, and also to bring the bowl beneath and in alignment with the gear casing 17 to permit of the operation of the beater 19 to effect the usual mixing operations. As indicated in Figure 2, by dotted lines, it will be understood that the bowl support and the bowl carried thereby may be swung from an intermediate mixing position either to the right or to the left into positions for inserting and removing the bowl.

For the purpose of introducing a tempering fluid into the bowl-holder 1, there is provided an upright supply pipe 30, the lower end of which is connected to the top of the pintle 24 by a swivel joint 31 which includes a stuffing box, and the upper portion of the pintle 24 is tubular or provided with a longitudinal passage 32 communicating at its upper end with the pipe 30 and at its lower end with a lateral branch passage 33 communicating with a port or opening 34 in the lug 23 and the side of the bowl-holder 1 and also communicating with the interior of the bowl-holder. It will thus be understood that any fluid passing through the pipe 30 will be conducted into the space between the bowl-holder 1 and the bottom portion of the bowl 2. Branch pipes 35 and 36 connect with the top portion of the pipe 30, one of which branch pipes is in communication with a source of steam supply while the other is in communication with a water supply, hot or cold, as may be desired. The branch pipe 35 is provided with a suitable controlling valve 37 and a suitable controlling valve 38 is provided for branch 36, whereby the supply of fluid to the bowl support may be conveniently controlled.

For the purpose of holding the bowl support fixed in its intermediate operating position, there is provided latch means mounted on the base 15 and including an upstanding casing 39 rising from the base and housing a latch or bolt head 40 projecting through the open top of the casing and having a stem 41 extending downwardly through the bottom of the casing and pivotally connected to a pedal or foot lever 42 suitably pivoted at 43 upon the base 15. A helical spring 44 within the casing 39 bears at its lower end against the bottom of the casing and at its upper end against the under side of the latch head 40 so as to yieldingly project the latter into engagement with a keeper 45 provided upon the front bottom portion of the bowl support 1. The bottom of the casing 39 constitutes a stop against which the lever 42 engages so as to prevent entire displacement of the latch head 40 from the casing. The foot controlled latch has the advantage that it leaves the hands of the attendant free for manipulating the bowl-holder for moving the same into and out of mixing position.

Provision is made for draining the bowl support 1 and for effecting an automatic blow-off of steam before a dangerous pressure has been built up within the bowl support. In accomplishing these results, there is provided a valve casing 46 having connection 47 with one side of the lower portion of the bowl support 1, the bottom of the latter being provided with a depression 48 to accommodate the connection 47 and to bring it to the lowermost portion of the rounded bottom of the bowl support 1. Within the valve casing there is a suitable valve 49 having a stem 50 projecting externally of the valve casing and engaged with the upright arm of a bell crank lever 51 fulcrumed at 52 upon a bracket 53 carried by the valve casing, there being a suitable weight 54 adjustable upon the horizontal arm of the bell crank lever, whereby the valve 49 is yieldably held seated. Under excess pressure, the valve 49 will be opened and the pressure conducted from the bowl support by a pipe 55 leading from the bottom of the valve casing 46. Hand manipulation of the bell crank lever 51 may be accomplished by means of an upstanding rod 56 pivoted to and rising from the horizontal arm of the bell crank lever 51 and having its upper screw threaded end passing through an opening in an extension 57 of the flange 4 on the top of the bowl support and carrying at its upper end a suitable handle 58 having a nut portion engaging the screw threaded end of the rod 56. By screwing down upon the handle 58, the horizontal arm of the bell crank lever 51 may be lifted and maintained in a lifted position so as to permit draining of the bowl support 1 through the valve 46 and the pipe 55. It is preferable to have the pipe 55 rather short and provided with an elbow 59 from which a horizontal pipe 60 leads radially inward beneath the bowl support, and its inner end is provided with an elbow 61 located in alignment with the vertical center of the bowl support, and from this elbow 61, another pipe 62 extends radially and at right angles to the pipe 60 and leads to a vertically disposed elbow 63 which in turn is connected to an upright pipe 64 beneath and in vertical alignment with the pintle 24, and from this pipe 64 a pipe 65 leads to any remote tank or the like for receiving the drainings from the bowl support 1. By locating the elbow 63 and the pipe 64 in axial alignment with the pintle 24 and providing a swivel joint 66 for the pipe 64, the drain pipes do not interfere with the swinging of the bowl support into and out of its operative position.

When a mixing machine is equipped with the bowl support or holder of the present invention, the machine may function in its usual manner, and in addition thereto a tempering fluid may be conducted into the bowl-holder, which latter in cooperation with the lower portion of the bowl provides a jacket for containing the tempered fluid, whereby the contents of the bowl may be tempered during the mixing operation or prior thereto or subsequent thereto. Furthermore cooking operations may be carried on in the same bowl by the introduction of steam into the bowl-holder, thereby permitting of the use of a single bowl for the usual operations of mixing dough and confections and also for cooking fillings for confections and also for making soups and the like.

The construction of the present invention is such that it may be conveniently applied to standard mixing machines which have a base, a standard and overhanging gearing for actuating a beater, and also are usually provided with upper and lower lugs corresponding to the lugs 21 and 22 illustrated in the present drawings. The presence of the present invention does not interfere in any manner whatsoever with the mixing operations of the machine and in addition thereto materially enlarges the scope of usefulness of the mixing machine in that the contents of the bowl may be conveniently tempered within a wide range of degrees and mixing operations may be carried on while the contents of the bowl are being tempered or cooked.

What is claimed is:

1. In a mixing machine, the combination with a base, a standard, and beater driving means carried by the standard and overhanging the base, of a bowl-holder carried by the standard and mounted to swing upon a vertical axis, said bowl-holder being open and unobstructed at its top for the introduction and removal of a bowl, said bowl-holder constituting a bowl enclosing jacket for the reception of a tempering fluid, and means for supplying a tempering fluid to the bowl-holder regardless of the position thereof.

2. In a mixing machine, the combination with a base, a standard, and beater driving means carried by the standard and overhanging the base, of a bowl holder carried by the standard and mounted to swing upon a vertical axis, said bowl-holder being open and unobstructed at its top for the introduction and removal of a bowl, said bowl-holder constituting a bowl enclosing jacket for the reception of a tempering fluid, means for supplying a tempering fluid to the bowl-holder regardless of the position thereof, and means for draining the bowl-holder to a predetermined point regardless of the position of the bowl-holder.

3. In a mixing machine, the combination with a base, a standard, and beater actuating means carried by the standard and overhanging the base, of a bowl-holder carried by the standard and mounted to swing upon a vertical axis, a bowl removably supported within the bowl-holder and spaced from the walls thereof, means for supplying a tempering fluid through the axis of movement of the bowl-holder to the space between the holder and the bowl, a drain pipe, and a pipe connection leading from the bowl-holder to the drain pipe and swiveled to the latter in alignment with the axis of movement of the bowl-holder.

4. A mixing machine provided with a bowl-holder constituting a bowl-enclosing jacket for the reception of a tempering fluid, means to permit movement of the bowl-holder in a horizontal plane to and from its operative position, means for supplying a tempering fluid to the bowl holder regardless of the position thereof, and other means for draining the bowl holder to a predetermined point regardless of the position of the bowl holder.

5. A mixing machine provided with a bowl-holder constituting a bowl-enclosing jacket for the reception of a tempering fluid, said bowl-holder being mounted to swing to and from its operative position upon a vertical axis, means for supplying a tempering fluid to the bowl-holder and through the axis of movement thereof, means for draining the bowl-holder having a swivel joint in alignment with the axis of movement of the bowl-holder.

6. A mixing machine provided with a bowl-holder constituting a bowl-enclosing jacket for the reception of a tempering fluid, said bowl-holder being mounted to swing to and from its operative position upon a vertical axis, a drain pipe, and a pipe connection from the bowl-holder to the drain pipe and swiveled thereto in alignment with the axis of movement of the bowl-holder.

7. In a mixing machine, the combination with a standard having a pair of laterally projecting upper and lower lugs, a bowl-holder constituting a bowl-enclosing jacket for the reception of a tempering fluid, said bowl-holder having a vertical pintle mounted to turn in the lugs of the standard, said pintle having a longitudinal passage and a lateral passage communicating with the interior of the bowl-holder, and means for supplying a tempering fluid to the longitudinal passage of the pintle.

8. In a mixing machine, the combination of a mixing bowl and a bowl-holder having an internal annular flange, the bowl being removably seated within the holder and provided with an external band supported upon the flange of the bowl-holder, the bottom portion of the bowl being spaced from the bowl-holder, means for supplying a tempering fluid under pressure into the space between the bowl and the bowl-holder, and a gasket between the flange and the band, the flange being provided on its top with an annular groove and also provided with passages communicating between the groove and the space between the bowl and the bowl-holder, the gasket covering the top of the groove.

9. A bowl-holder for mixing machines, comprising a body having an open top for the reception of a bowl, said body having an internal annular flange, the top of the flange having an annular groove and also provided with passages communicating between the interior of the bowl-holder and the groove, and a gasket loosely secured upon the top of the flange and covering the open upper side of the groove.

HERBERT H. HACKSTEDDE.